US010985616B2

(12) United States Patent
Cimaz

(10) Patent No.: US 10,985,616 B2
(45) Date of Patent: Apr. 20, 2021

(54) CONTACTLESS TRANSMITTER

(71) Applicant: STMicroelectronics (Grand Ouest) SAS, Delarue (FR)

(72) Inventor: Lionel Cimaz, Pleumeleuc (FR)

(73) Assignee: STMICROELECTRONICS (GRAND OUEST) SAS, Delarue (FR)

(*) Notice: Subject to any disclaimer, the term of this patent is extended or adjusted under 35 U.S.C. 154(b) by 75 days.

(21) Appl. No.: 16/352,248

(22) Filed: Mar. 13, 2019

(65) Prior Publication Data
US 2019/0305601 A1 Oct. 3, 2019

(30) Foreign Application Priority Data

Mar. 30, 2018 (FR) ..................................... 1852778

(51) Int. Cl.
| H01F 27/42 | (2006.01) |
| H01F 37/00 | (2006.01) |
| H01F 38/00 | (2006.01) |
| H02J 50/12 | (2016.01) |
| H04B 5/00 | (2006.01) |
| H02J 7/02 | (2016.01) |
| H01F 38/14 | (2006.01) |

(52) U.S. Cl.
CPC ............. H02J 50/12 (2016.02); H01F 38/14 (2013.01); H02J 7/025 (2013.01); H04B 5/0037 (2013.01); H04B 5/0081 (2013.01)

(58) Field of Classification Search
CPC . H02J 5/005; H02J 7/025; H02J 17/00; H01F 38/14; B60L 11/182

USPC ........................................................ 307/104
See application file for complete search history.

(56) References Cited

U.S. PATENT DOCUMENTS

| 2008/0197712 | A1* | 8/2008 | Jin ............................ G01V 3/10 307/104 |
| 2010/0171368 | A1 | 7/2010 | Schatz et al. |
| 2014/0225458 | A1* | 8/2014 | Rehm ...................... H02J 50/80 307/149 |
| 2014/0266019 | A1* | 9/2014 | Pigott ..................... H02J 50/12 320/108 |
| 2015/0115882 | A1 | 4/2015 | Huang et al. |
| 2015/0207333 | A1* | 7/2015 | Baarman ................. H02J 50/12 307/104 |
| 2015/0249359 | A1 | 9/2015 | Gunderson |
| 2016/0043562 | A1* | 2/2016 | Lisi ........................ H02J 7/0047 307/104 |
| 2016/0056664 | A1* | 2/2016 | Partovi .................. B60L 53/122 307/104 |
| 2016/0303301 | A1 | 10/2016 | Bluvshtein et al. |
| 2016/0372934 | A1* | 12/2016 | Cimaz .................... B60L 53/122 |

(Continued)

FOREIGN PATENT DOCUMENTS

| EP | 0905856 A1 | 3/1999 |
| EP | 3121932 A1 | 1/2017 |

(Continued)

Primary Examiner — Quan Tra
(74) Attorney, Agent, or Firm — Slater Matsil, LLP

(57) ABSTRACT

A method for transmitting power includes providing power using a contactless power transfer from a transmitter to a receiver that is mutually coupled with the transmitter. The method also includes managing and regulating the contactless power transfer being provided, where the managing and regulating are integrally and autonomously performed by the transmitter.

21 Claims, 3 Drawing Sheets

(56) References Cited

U.S. PATENT DOCUMENTS

| | | |
|---|---|---|
| 2017/0229915 A1 | 8/2017 | Kuboshima et al. |
| 2019/0148993 A1* | 5/2019 | Tsai ........................ H02J 50/90 |
| | | 307/104 |
| 2019/0372934 A1* | 12/2019 | Yehudai ............... G06K 9/6215 |

FOREIGN PATENT DOCUMENTS

| | | |
|---|---|---|
| FR | 2984032 A1 | 6/2013 |
| WO | 2009081115 A1 | 7/2009 |
| WO | 2010030977 A2 | 3/2010 |

* cited by examiner

CONTACTLESS TRANSMITTER

CROSS-REFERENCE TO RELATED APPLICATIONS

This application claims priority to French Patent Application No. 1852778, filed on Mar. 30, 2018, which application is hereby incorporated herein by reference.

TECHNICAL FIELD

Implementations and embodiments of the invention relate to power transfer, for example, but not restrictively to a transmitter for contactless power transfer.

BACKGROUND

Contactless charging technology makes it possible to contactlessly transfer power from a power source (e.g. a charger) to a load, e.g., a wireless communication device such as a mobile cellular phone, through the air space separating the charger and the load.

Among the various existing contactless charging standards, the Qi standard developed by the "Wireless Power Consortium" (WPC) is well known to the person skilled in the art and notably, the low power version capable of delivering a power up to 5 W.

For all intents and purposes, the person skilled in the art may refer to the document entitled "System Description Wireless Power Transfer" volume I: Power, Part 1: Interface Definition, Version 1.1.2 Jun. 2013.

Briefly, contactless power is transferred from a base station or transmitter to a receiver magnetically coupled to the transmitter via coils, for example.

The transmitter conventionally comprises a capacitive-inductive resonant system in which the inductive element is also the coil that generates the magnetic field. This resonant system is excited by a driver circuit which together forms a switching resonant circuit.

The power transfer is based on a magnetic field generated by the transmitter, via coils, for example, and captured by the receiver.

The Qi standard allows various techniques (topologies) for generating the magnetic field on the transmitter side. But this magnetic field is always an oscillating field and the frequency range is between 110 kHz and 205 kHz.

The way in which the magnetic field is generated and the way in which the power varies depends on the topology used on the transmitter side.

The receiver converts this magnetic field into an electrical potential used for charging the batteries or powering a device.

So as to be able to regulate and secure the system, a communication channel exists between the receiver and the transmitter.

The receiver measures the power that it receives and compares it to the power that it needs. The difference between these two power values is a regulation error.

This regulation error is transmitted to the transmitter using the communication channel and the transmitter adapts the power of the transmitted field taking account of the received regulation error.

The measurement by the receiver of the power received by the transmitter requires the implementation of measurement means configured for measuring the power received by the transmitter, comparison means for comparing the power received to that which it needs and for extracting the regulation error therefrom. These means have a cost.

In addition, in some situations, the transmission of the regulation error by the receiver to the transmitter via coils can be laborious. The use of a specific contactless power transfer solution is recommended and this demands an additional cost.

Also, according to the bandwidth of the communication channel, the transmission of the regulation error is delayed. Because of this delay, some solutions may undergo fast charge transition states.

SUMMARY

In accordance with an embodiment of the invention, a method for transmitting power includes providing power using a contactless power transfer from a transmitter to a receiver that is mutually coupled with the transmitter. The method also includes managing and regulating the contactless power transfer being provided, where the managing and regulating are integrally and autonomously performed by the transmitter.

In accordance with an embodiment of the invention, a transmitter comprises a processing circuit configured to integrally perform a management and regulation of power transfer autonomously from the transmitter to a receiver, where the transmitter is configured to provide contactless power transfer to the receiver.

In accordance with an embodiment of the invention, a transmitter comprises a resonant circuit comprising a transmitting coil driven by a driver circuit based on a control signal having a control frequency. A measurement circuit is configured to measure a physical variable of a current/voltage in the resonant circuit. An adjustment circuit is configured to adjust the control signal based on the measured physical variable.

BRIEF DESCRIPTION OF THE DRAWINGS

Other advantages and features of the invention will appear in the detailed description of implementations and embodiments, in no way restrictive, and from the attached drawings in which.

DETAILED DESCRIPTION OF ILLUSTRATIVE EMBODIMENTS

Figure 1:
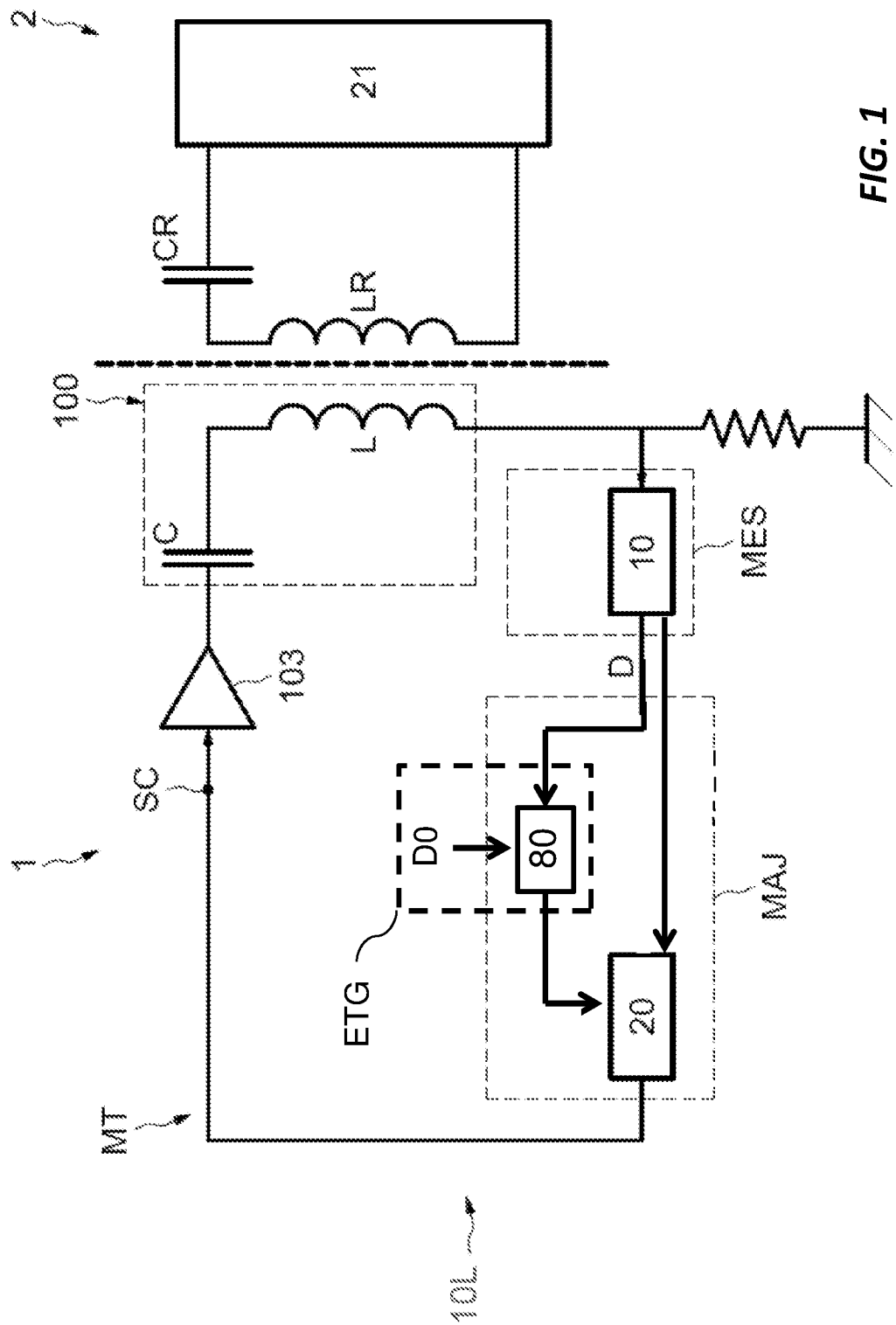
FIGS. 1 to 3 schematically illustrate embodiments and implementations of the invention.

According to one implementation and embodiment, voltage received by the receiver is regulated, which offers better efficiency at lower cost while being less complex to achieve.

Thus, according to one aspect, a method for managing a regulated contactless power transfer from a transmitter to a receiver mutually coupled with one another is provided, said management and said regulation being integrally and autonomously performed by the transmitter.

A management and a regulation of the power transfer integrally and autonomously performed by the transmitter notably means that the transmitter performs the management and regulation of the power transfer without it being necessary to receive from the receiver any information relating to said power or to said regulation.

Thus, the transmitter may dispense with, for example, receiving a regulation error delivered by the receiver or an indication of energy or power required at the receiver and delivered by the receiver.

According to one implementation, the method comprises: a generation of a magnetic field by the transmitter from a control signal having a control frequency; a measurement of at least one physical variable in the transmitter; and an adjustment of said control frequency according to said measurement.

The adjustment of said control frequency makes it possible to deliver more or less power to the receiver and thus stabilize the voltage received by the receiver, and this only by using at least one physical variable available in the transmitter, e.g. a current/voltage phase shift or a voltage.

According to one implementation, the control signal is a delayed signal, and the adjustment of the control frequency comprises an adjustment of the value of the delay from the measurement of said at least one physical variable.

According to one implementation, the generation of the magnetic field is performed by a switching resonant circuit controlled by the control signal, the measurement of said at least one physical variable comprises a measurement of a voltage/current phase shift of a current flowing in the resonant circuit, and the value of the delay is adjusted to a target value corresponding to a desired voltage/current phase shift.

The measurement of the phase shift makes it possible to extract the value of the delay and thus to adjust it to a target value.

The person skilled in the art will know how to choose the target value according to the components of the circuit.

According to one implementation, the measurement of said at least one physical variable further comprises a measurement of a voltage at an oscillating node common to the capacitive element and to the inductive element of the resonant circuit, and a measurement of the average level of the control signal. The value of the delay is adjusted to a value equal to said target value increased by a first corrective value resulting from the value of said voltage measured at said oscillating node and a second corrective value resulting from the measurement of said average level.

When the voltage drops at the receiver, it is advantageous to compensate for said drop by sending more power to the receiver. For this, it is advantageous to take into account said second corrective value in adjusting the delay.

Indeed, measuring the average level of the control signal makes it possible to increase the target value of said second corrective value and thereby compensate for the voltage drop in the receiver.

The variations in the value of the coefficient of magnetic coupling between the receiver and the transmitter also cause the voltage received by the receiver to vary.

Measuring the voltage at said oscillating node is a good indicator of the value of the coefficient of magnetic coupling.

It is therefore desirable to measure the voltage at the oscillating node and extract a first correction value therefrom which makes it possible to adjust the value of the delay.

According to another aspect, a transmitter is provided intended to be coupled to a receiver for a regulated contactless power transfer from the transmitter to the receiver, comprising processing circuit configured for integrally performing a management and said regulation of the power transfer autonomously.

According to one embodiment, the processing circuit comprise: generating circuit configured for generating by the transmitter a magnetic field from a control signal having a control frequency. A measurement circuit is configured for measuring at least one physical variable in the transmitter;

An adjustment circuit is configured for adjusting said control frequency according to said measurement.

According to one embodiment, the adjustment circuit comprises an adjustable delay circuit that delivers the control signal, and an adjustment stage configured for adjusting the value of the delay from said at least one measured physical variable.

According to one embodiment, the generating circuit comprises a switching resonant circuit, the measurement circuit comprises a first circuit capable of delivering a voltage/current phase shift of a current flowing in the resonant circuit, and the adjustment stage is configured for adjusting the value of the delay to a target value corresponding to a desired voltage/current phase shift.

According to one embodiment, the measurement circuit comprises a second circuit capable of measuring a voltage at an oscillating node common to the capacitive element and to the inductive element of the resonant circuit and a third circuit capable of measuring the average level of the control signal.

And the adjustment stage is advantageously configured for adjusting the value of the delay to a value equal to the target value increased by a first corrective value resulting from the value of said voltage measured at said oscillating node and a second corrective value resulting from the measured average level of the control signal.

Embodiments of the present application will now be described more precisely within the context of the Qi standard but is in no way limited to this particular example and may notably be applied to any field in which there is a magnetic coupling between a transmitter and a receiver, the transmitter driving a carrier of power intended for the receiver using this magnetic coupling and the receiver itself modulating the carrier for communicating with the transmitter.

In FIG. 1, the reference 1 designates a transmitter, e.g. a base station or a charger, and the reference 2 designates a receiver, magnetically coupled to the transmitter, e.g. a cellular mobile telephone, for a regulated power transfer from the transmitter to the receiver for, for example, recharging a battery thereof or powering a component or device housed inside the receiver.

In general, the transmitter comprises processing circuit MT configured for managing and regulating the power transfer to the receiver autonomously.

The processing circuit MT comprises a generating circuit configured for generating, by the transmitter, a magnetic field from a control signal SC having a control frequency.

The generating circuit comprises an inductive-capacitive resonant circuit 100, comprising a capacitive element C connected to an inductive element L, such as a coil, itself connected to the earth. This resonant circuit 100 is driven by a driver circuit 103.

The resonant circuit 100 and the driver circuit 103 assembly forms a switching resonant circuit.

Figure 2:
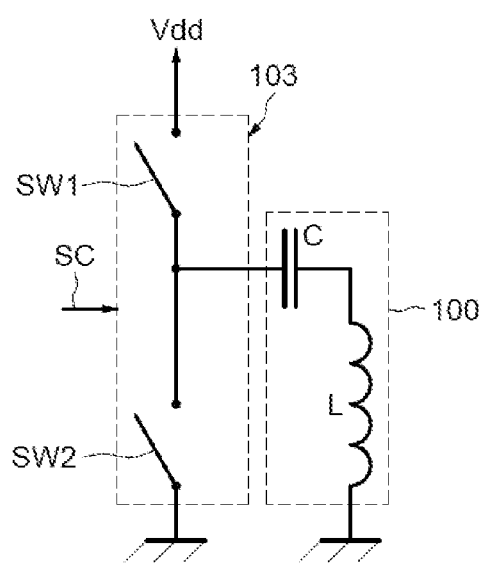

By way of non-restrictive example, one embodiment of a driver circuit 103 is illustrated in FIG. 2. Here it comprises two switches such as, for example, MOS transistors, SW1 and SW2 connected in series between the supply voltage Vdd and the earth. These two switches, forming a half-bridge are driven by the control signal SC comprising an alternation of high levels and low levels.

Of course, other embodiments of a driver circuit 103 are possible, such as a full bridge assembly, for example.

The processing circuit MT also comprise measurement circuit MES comprising a first circuit 10 capable of delivering a voltage/current phase shift of a current flowing in the circuit.

The processing circuit MT also comprises adjustment circuit MAJ configured for adjusting said control frequency of the control signal SC according to the measurement made by the first circuit 10.

The adjustment circuit MAJ comprises an adjustable delay circuit 20 that delivers the control signal SC, and an adjustment stage ETG comprising an ETG circuit 80 configured for adjusting the value of the delay of the control signal SC from the measurement performed by the first circuit 10.

The first circuit 10 sends the measurements relating to the voltage/current phase shift D to an input of the adjustable delay circuit 20 and the input of the ETG circuit 80 which also takes as input a target value Do corresponding to a desired voltage/current phase shift.

The ETG circuit 80 adjusts the value of the delay of the measured voltage/current phase shift to a target value and accordingly delivers the voltage/current phase shift matched with the target value Do to the adjustable delay circuit 20.

The adjustable delay circuit 20 is configured to receive the measurements relating to the voltage/current phase shift D from the first circuit 10 as well as the adjustment value in voltage/current phase shift from the ETG circuit 80. The output of the adjustable delay circuit 20, delivers the control signal SC, which is then looped back to the input of the driver circuit 103.

For example, in one embodiment, the first circuit 10 comprises a zero cross detector that measures, in the resistor within the zero cross detector, a raw value of current polarity of the current flowing in the tank circuit 100. The zero cross detector in the first circuit 10 sends this measured raw value of current polarity to the adjustable delay circuit 20. The adjustable delay circuit 20, which may be a delay line, pushes a delayed signal to the driver 103 thereby forming an oscillating loop. The time between the zero crossings, i.e., polarity inversion of the current flowing in the tank circuit 100, is used by the ETG circuit to determine the delay value to be used by the delay line in the adjustable delay circuit 20. In particular, the ETG circuit 80 may receive a target timing Do, which is then compared with the effective timing computed from the zero crossings. Based on the time error between the effective timing D and the target timing Do, the ETG circuit 80 computes an adjustment value, which is then provided to the delay line in the adjustable delay circuit 20. Based on the adjustment value, the adjustable delay circuit 20 adjusts the delayed signal, which is then provided to the driver 103. This changes the loop timing.

The adjustment of the value of the delay by the adjustable delay circuit 20 makes it possible to stabilize the voltage received by the receiver.

The person skilled in the art will know how to choose said target value Do according to the components of the circuit, the characteristics of the receiver and the nominal power level necessary to the receiver.

It can therefore be seen here that a loop 10L has been formed within the transmitter comprising the switching resonant circuit 100, the driver circuit 103, the measurement circuit MES and the adjustment circuit MAJ.

Before returning in more detail to the operation of this system, the structure of the receiver side 2 will be described.

The latter also comprises a capacitive-inductive circuit comprising an inductive element LR, e.g. a coil, coupled to the coil L of the circuit 100, and a capacitive element CR.

The various components and notably the battery of the receiver 2 are designated overall under the reference 21 and notably comprise a rectifier bridge (not represented here for simplification purposes) connected to the terminals of the inductive-capacitive circuit LR, CR.

Now a description is given of an implementation of the method for managing a power transfer from the transmitter to the receiver, according to the invention.

Since the control signal SC is a delayed signal, the adjustment of the control frequency for delivering more or less power to the receiver comprises the adjustment of said delay.

For this, the first circuit 10, e.g. a zero crossing detector or any other component making it possible to detect the current/voltage phase shift, extracts a delay value D.

This delay value D will be adjusted via the ETG circuit 8o, to said target value Do corresponding to the desired voltage/current phase shift.

Said set delay makes it possible to offer a better stability in the voltage received by the receiver.

However, the inventor has observed the possible presence of voltage drops in the receiver.

Also, the variations in the value of the coefficient of magnetic coupling between the transmitter and the receiver may disturb the stability of the voltage received by the receiver.

It is therefore desirable to take these parameters into account and add other circuits to the transmitter described in FIG. 1.

Figure 3:
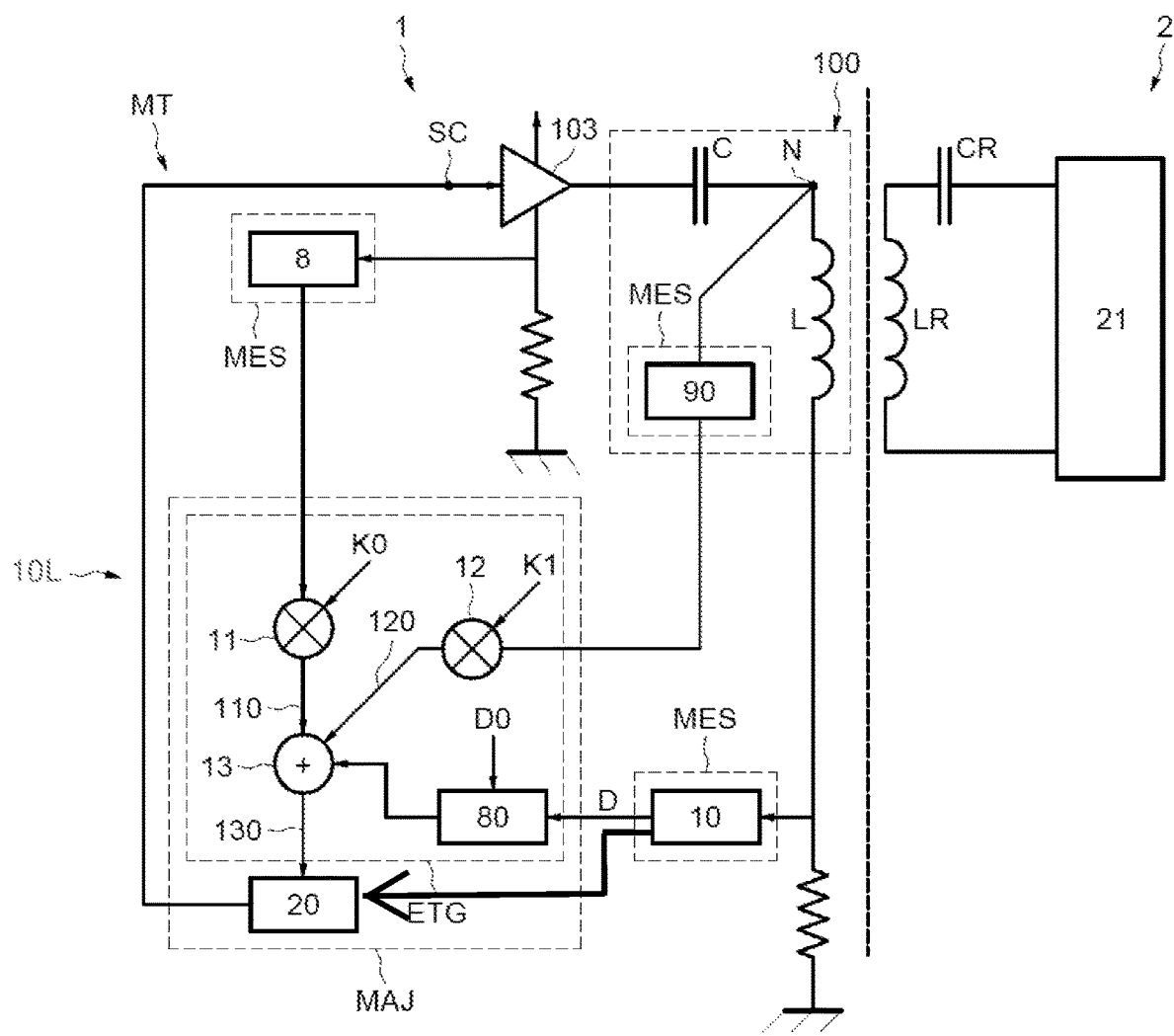

As illustrated in FIG. 3, which illustrates another embodiment, the measurement circuit MES further comprises a second circuit 90 capable of measuring a voltage at an oscillating node N common to the capacitive element C and to the inductive element L of the resonant circuit 100.

This second circuit 90 may be simply a resistive circuit connected between the node N and the earth. It could also comprise if necessary a divider bridge.

The voltage measured at the oscillating node N is received at the input of a first multiplier 12 comprised in the adjustment stage ETG for multiplying the measured voltage by a first coefficient K1.

The person skilled in the art will know how to choose the value of said first coefficient K1 according to the components of the resonant circuit.

The multiplier 12 delivers a first corrective value 120 at the output to an adder 13 of the adjustment stage ETG.

This first corrective value makes it possible to adjust the delay according to the variations in the coefficient of the magnetic coupling between the receiver 2 and the transmitter 1.

Indeed, the voltage measured at the oscillating node N is a good indicator of the coefficient of magnetic coupling between the receiver and the transmitter.

Thus, the value of the delay of the control signal SC is adjusted according to the variation in the coefficient of magnetic coupling between the receiver and the transmitter.

The measurement circuit MES of the transmitter 1 also comprise a third circuit 8 capable of measuring the average level of the control signal SC, here the current.

The measured average current is received at the input of a second multiplier 11 of the adjustment stage ETG for multiplying the measured average level by a second coefficient K0.

The person skilled in the art will know how to choose the value of said first coefficient K0 according to the components of the resonant circuit.

The second multiplier delivers a second corrective value 110 at the output to the adder 13.

This second corrective value makes it possible to adjust the delay of the control signal according to the average current measured in the driver circuit 103.

And thus, the voltage drops in the receiver will be compensated.

The adder 13 also receives the target value Do at the input.

The output of the adder 13 delivers a value 130 corresponding to a delay value to the adjustable delay circuit 20.

The adjustable delay circuit 20 delivers the updated control signal SC and thus makes it possible to stabilize the voltage received by the receiver 2 according to the parameters cited above, and this without receiving a regulation error via said receiver 2.

What is claimed is:

1. A method for transmitting power, the method comprising:
   providing power using a contactless power transfer from a transmitter to a receiver that is mutually coupled with the transmitter; and
   managing and regulating the contactless power transfer being provided, wherein the managing and regulating are integrally and autonomously performed by the transmitter, wherein the managing and regulating comprises
      at a resonant circuit in the transmitter, generating a magnetic field from a control signal having a control frequency, wherein the resonant circuit comprises a capacitor and an inductor,
      measuring a current flowing through the inductor,
      determining a voltage/current phase shift of a current flowing in the resonant circuit by measuring a polarity inversion based on the current flowing through the inductor, and
      adjusting the control frequency of the control signal according to the determined voltage/current phase shift and a desired voltage/current phase shift.

2. The method according to claim 1, wherein the adjusting comprises adjusting a delay extracted from the determined voltage/current phase shift, the delay being adjusted to the desired voltage/current phase shift.

3. The method according to claim 1, wherein the resonant circuit comprises a switching resonant circuit controlled by the control signal.

4. The method according to claim 3, wherein the switching resonant circuit comprises a capacitor and an inductor, and a driver circuit.

5. The method according to claim 4, further comprising measuring a voltage at an oscillating node common to the capacitor and to the inductor, wherein the adjusting the control frequency of the control signal comprises a delay of the control signal to substantially match a target value increased by a corrective value resulting from the measured voltage at the oscillating node.

6. The method according to claim 4, further comprising measuring an average level of the control signal, wherein the adjusting the control frequency of the control signal comprises a delay of the control signal to substantially match a target value increased by a corrective value resulting from the measured average level of the control signal.

7. A transmitter comprising:
   a resonant circuit configured to generate a magnetic field from a control signal having a control frequency, the resonant circuit comprising a capacitor and an inductor, the inductor having a first end coupled to a reference potential and a second end that is coupled to the capacitor at an oscillating node common to the capacitor and the inductor;
   a measurement circuit coupled to the inductor at the first end and configured to measure a current flowing through the inductor and determine a voltage/current phase shift of a current flowing in the resonant circuit based on the current flowing through the inductor; and
   an adjustment circuit configured to adjust the control frequency based on the determined voltage/current phase shift and a desired voltage/current phase shift,
   wherein the transmitter is configured to integrally perform a management and regulation of power transfer autonomously from the transmitter to a receiver; and
   wherein the transmitter is configured to provide contactless power transfer to the receiver.

8. The transmitter according to claim 7, wherein the adjustment circuit comprises an adjustment stage circuit configured to adjust a delay extracted from the determined voltage/current phase shift and an adjustable delay circuit that delivers the control signal with the adjusted delay.

9. The transmitter according to claim 8, further comprising a switching resonant circuit comprising the resonant circuit and a driver circuit.

10. The transmitter according to claim 9, wherein the measurement circuit is configured to measure a polarity inversion of a current flowing at the second end.

11. The transmitter according to claim 10, wherein the measurement circuit is configured to measure a voltage at the oscillating node; and
    wherein the adjustment stage circuit is configured to adjust the delay to substantially match a target value increased by a corrective value, wherein the target value corresponds to the desired voltage/current phase shift, wherein the corrective value corresponds to the measured voltage at the oscillating node.

12. The transmitter according to claim 10, wherein the measurement circuit is configured to measure an average level of the control signal; and
    wherein the adjustment stage circuit is configured to adjust the delay to substantially match a target value increased by a corrective value, wherein the target value corresponds to the desired voltage/current phase shift, wherein the corrective value corresponds to the measured average level of the control signal.

13. A transmitter comprising:
    a resonant circuit comprising a transmitting coil driven by a driver circuit based on a control signal having a control frequency;
    a measurement circuit configured to measure a current flowing through the transmitting coil, wherein the measurement circuit is configured to detect a current/voltage phase shift of a current flowing in the resonant circuit by measuring a polarity inversion based on the current flowing through the transmitting coil, and extract a delay corresponding to the detected current/voltage phase shift; and
    an adjustment circuit configured to adjust the control signal based on the detected current/voltage phase shift, wherein the adjustment circuit comprises an adjustment stage circuit and an adjustable delay circuit, wherein the adjustment stage circuit is configured to
       receive the delay corresponding to the detected current/voltage phase shift from the measurement circuit, and
       adjust the delay based on a target value for the delay to an adjusted value; and wherein the adjustable delay circuit is configured to deliver an adjusted control signal to the driver circuit based on the adjusted value.

14. The transmitter according to claim 13, wherein the transmitting coil has a first end coupled to a capacitor of the resonant circuit and a second end coupled to the measurement circuit, wherein the measurement circuit comprises a zero crossing detector coupled to the transmitting coil and configured to measure the polarity inversion.

15. The transmitter according to claim 13, further comprising:
a voltage measuring circuit configured to measure a voltage at a node between the transmitting coil and a capacitor of the resonant circuit;
a multiplier configured to receive the measured voltage at the node and output a corrective value; and
an adder coupled between the adjustment stage circuit and the adjustable delay circuit, wherein the adder is configured to add the corrective value and the adjusted value of the delay of the control signal based on the target value and output to the adjustable delay circuit.

16. The transmitter according to claim 13, further comprising:
a circuit configured to measure an average level of the control signal in the driver circuit;
a multiplier configured to receive the measured average level of the control signal and output a corrective value; and
an adder coupled between the adjustment stage circuit and the adjustable delay circuit, wherein the adder is configured to add the corrective value and the adjusted value of the delay of the control signal based on the target value and output to the adjustable delay circuit.

17. The transmitter according to claim 13, further comprising a switching resonant circuit comprising the resonant circuit and the driver circuit.

18. The transmitter according to claim 13, wherein the transmitting coil has a first end coupled to a capacitor of the resonant circuit and a second end coupled to the measurement circuit.

19. The method according to claim 1, wherein the adjusting comprises adjusting a delay extracted from the determined voltage/current phase shift, the delay being adjusted to the desired voltage/current phase shift based on a target value for the delay, the method further comprising:
measuring a voltage at a node between the inductor and the capacitor of the resonant circuit;
receiving the measured voltage at the node and output a corrective value; and
adding the corrective value and the adjusted value of the delay of the control signal based on the target value and outputting to an adjustable delay circuit to an adjustable delay circuit to deliver an adjusted control signal to a driver circuit based on the adjusted value.

20. The method according to claim 1, wherein the adjusting comprises adjusting a delay extracted from the determined voltage/current phase shift, the delay being adjusted to the desired voltage/current phase shift based on a target value for the delay, the method further comprising:
measuring an average level of the control signal in a driver circuit driving the resonant circuit based on the control signal;
receiving the measured average level of the control signal and outputting a corrective value; and
adding the corrective value and the adjusted value of the delay of the control signal based on the target value and outputting to an adjustable delay circuit.

21. The method according to claim 1, wherein the adjusting comprises operating the resonant circuit close to the desired voltage/current phase shift while allowing the control frequency to change.

* * * * *